US010913101B2

(12) United States Patent
Brechling et al.

(10) Patent No.: US 10,913,101 B2
(45) Date of Patent: Feb. 9, 2021

(54) FORMING DEVICE AND METHOD FOR FORMING AN INNER RIM OF AN ANNULAR ROUND BLANK

(71) Applicant: SCHULER PRESSEN GMBH, Goeppingen (DE)

(72) Inventors: Carsten Brechling, Ulm (DE); Simon Kneer, Eislingen (DE)

(73) Assignee: SCHULER PRESSEN GMBH, Goeppingen (DE)

(*) Notice: Subject to any disclaimer, the term of this patent is extended or adjusted under 35 U.S.C. 154(b) by 278 days.

(21) Appl. No.: 15/965,874

(22) Filed: Apr. 28, 2018

(65) Prior Publication Data
US 2018/0243812 A1 Aug. 30, 2018

Related U.S. Application Data

(63) Continuation-in-part of application No. PCT/EP2016/075851, filed on Oct. 26, 2016.

(30) Foreign Application Priority Data

Nov. 6, 2015 (DE) .................. 10 2015 119 174

(51) Int. Cl.
B21D 31/04 (2006.01)
B44B 5/02 (2006.01)
(Continued)

(52) U.S. Cl.
CPC ............ *B21D 31/04* (2013.01); *B21J 5/12* (2013.01); *B21J 13/025* (2013.01); *B23P 9/00* (2013.01);
(Continued)

(58) Field of Classification Search
CPC ........ B21D 31/04; B21D 37/10; B21D 43/14; B44B 5/024; B44B 5/0052; B44B 5/02;
(Continued)

(56) References Cited

U.S. PATENT DOCUMENTS 632,938 A * 1/1899 Greenburg
2003/0167819 A1 * 9/2003 Olsson
(Continued)

FOREIGN PATENT DOCUMENTS

CN 2 900 009 Y 5/2007
CN 101 829 719 A 9/2010
(Continued)

OTHER PUBLICATIONS

Max, DE4137539A1translation.pdf, 1993.*
(Continued)

*Primary Examiner* — Adam J Eiseman
*Assistant Examiner* — Amer Islam
(74) *Attorney, Agent, or Firm* — Ronald S. Lombard

(57) ABSTRACT

A forming device and a method for forming an inner rim of an annular round blank. The forming device has a lower tool with a movable die and an upper tool arranged opposite the lower tool along a working axis A. By means of the die, the annular round blank is moved out of a transport plane T and into a forming position U towards the upper tool and into the interior of a holding sleeve. Subsequently, the inner rim is formed with the aid of a forming tool. After forming, the annular round blank is moved out of the forming position U and back into the transport plane T by means of the lower tool and/or the upper tool. The forming device and the forming method can occur while the round blanks are being fed to an embossing station while being transported by a revolving table.

16 Claims, 7 Drawing Sheets

(51) Int. Cl.
*B21J 5/12* (2006.01)
*B44B 5/00* (2006.01)
*B23P 9/00* (2006.01)
*B21J 13/02* (2006.01)
*B21D 37/10* (2006.01)

(52) U.S. Cl.
CPC ............ *B44B 5/0052* (2013.01); *B44B 5/024* (2013.01); *B21D 37/10* (2013.01)

(58) Field of Classification Search
CPC .. B44B 5/026; B21J 5/12; B21J 13/025; B21J 5/02; B21J 5/022; B21J 13/02; B23P 9/00
See application file for complete search history.

(56) References Cited

U.S. PATENT DOCUMENTS

2013/0309043 A1* 11/2013 McClung
2014/0000334 A1* 1/2014 Iwata

FOREIGN PATENT DOCUMENTS

| | | | | |
|---|---|---|---|---|
| CN | 101 850 389 | A | | 10/2010 |
| CN | 101850389 | A | * | 10/2010 |
| DE | 37 42 745 | A1 | | 7/1989 |
| DE | 41 37 539 | A1 | | 5/1993 |
| DE | 4137539 | A1 | * | 5/1993 ............... B44C 1/24 |
| DE | 198 41 622 | C2 | | 10/2003 |
| EP | 0 160 343 | A2 | | 11/1985 |

OTHER PUBLICATIONS

Wang, CN101850389A_Translation.pdf, 2010.*
The English translation of the "International Search Report" for the corresponding international application No. PCT/EP2016/075851, dated Jan. 27, 2017; 3 pages.

* cited by examiner

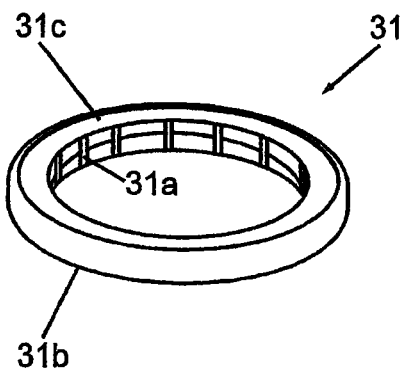
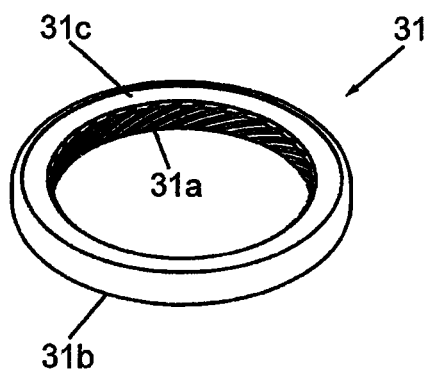
Fig.8 Fig.9
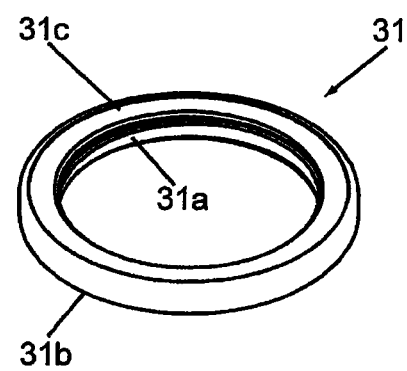
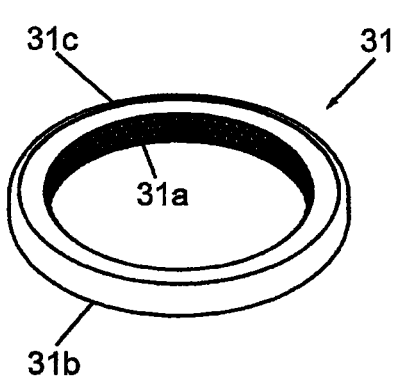
Fig.10 Fig.11
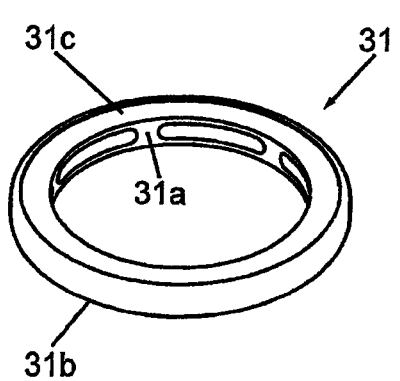
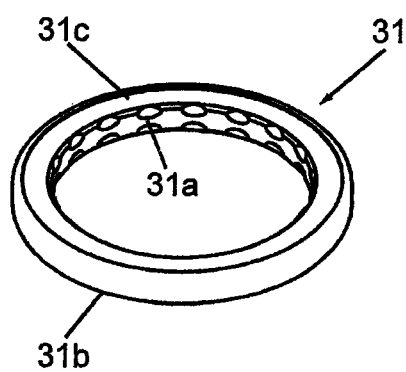
Fig.12 Fig.13

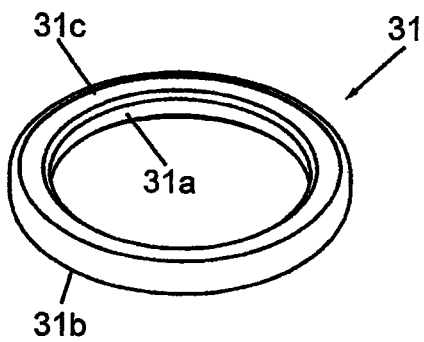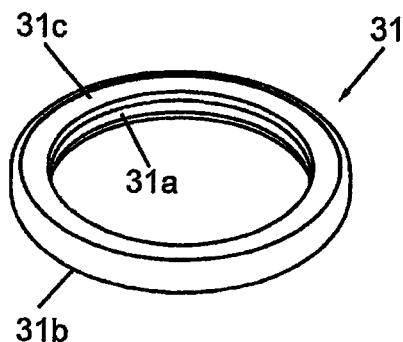
Fig.14         Fig.15
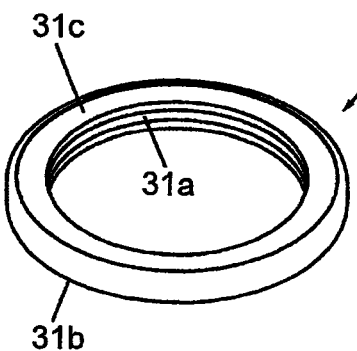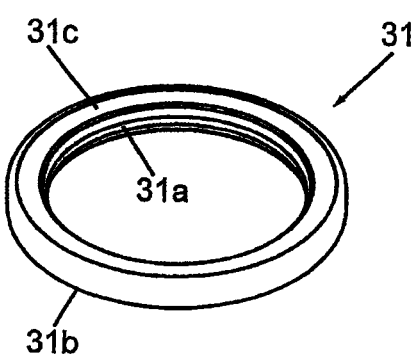
Fig 16         Fig.17
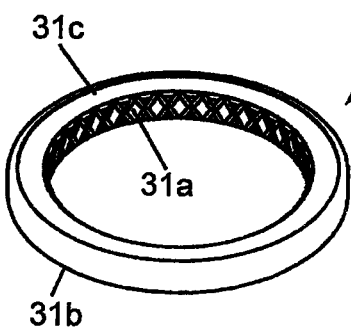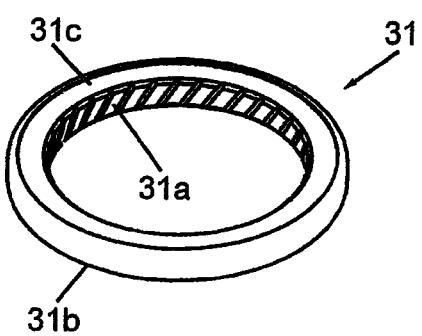
Fig.18         Fig.19
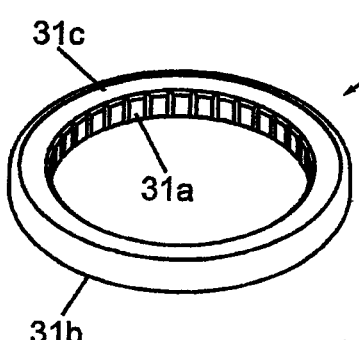
Fig.20

FORMING DEVICE AND METHOD FOR FORMING AN INNER RIM OF AN ANNULAR ROUND BLANK

CROSS-REFERENCE TO RELATED APPLICATIONS

This is a continuation-in-part application of pending international application PCT/EP2016/075851 filed Oct. 26, 2016, and claiming the priority of German application No. 10 2015 119 174.1 filed Nov. 6, 2015. The said International application PCT/EP2016/075851 and German application No. 10 2015 119 174.1 are both incorporated herein by reference in their entireties as though fully set forth.

BACKGROUND OF THE INVENTION

The invention relates to a forming device, as well as to a method for forming an inner rim of an annular round blank from a round blank.

A round blank is a coin blank that is embossed in an embossing station by means of an embossing press in order to obtain a coin. Basically, the round blank may consist of one part or of several parts. In a multi-part round blank, there is at least one annular round blank and at least one round blank core which is placed in the hole of the annular round blank. Several annular round blanks may also be arranged coaxially relative to each other.

Publication DE 198 41 622 C2 describes a joining device for joining at least two blanks into one part for the production of a two-color coin. To do so, the annular round blanks are passed below a supply channel. The round blank cores are set into the annular round blanks. In a subsequent joining station, the nested round blank components of the round blank are joined together.

A multi-part coin comprising an annular round blank and a round blank core and the joining thereof are also described in publication DE 37 42 745 A1. In doing so, the annular round blanks are first supplied to a revolving table. At one location there is provided a shaft with round blank cores that are stacked on top of each other. The respectively lowest round blank core is pushed via a slide out of the shaft that is open at the bottom and placed over the annular round blank. There, said core is pressed into the annular round blank by means of a spring-biased finger.

Such multi-part coins require that the parts will detach from each other after having been embossed only if a minimum force acts between the parts. This is to prevent that the coins are accidentally separated into their round blank components.

Therefore, the object of the present invention may be viewed to be the provision of a device and a method by means of which an annular round blank can be provided in a simple manner within the framework of the coin embossing process, said annular round blank providing an improved connection to the respectively adjoining annular round blank and round blank core, respectively.

SUMMARY OF THE INVENTION

This object is achieved by a forming device as well as by a method displaying the features of the claims. The invention relates to a forming device 30 and to a method for forming an inner rim 31a of an annular round blank 31. The forming device 30 has a lower tool 37 with a movable die 39 and an upper tool 38 arranged opposite the lower tool 37 along a working axis A. By means of the die 39, the annular round blank 31 is moved out of a transport plane T and into a forming position U towards the upper tool 38 and into the interior of a holding sleeve 61. Subsequently, the inner rim 31a is formed with the aid of a forming tool 47, 72. After forming, the annular round blank 31 is moved out of the forming position U and back into the transport plane T by means of the lower tool 37 and/or the upper tool 38. The forming device 30 and the forming method can occur while the round blanks are being fed—as takes place in any case—to the embossing station or embossing press, for example while the round blank parts and the round blanks, respectively, being transported by means of a revolving table.

The forming device for forming an inner rim of an annular round blank comprises a lower tool, as well as an upper tool. The lower tool has a die that can be moved along the working axis A and is disposed to move the annular round blank along the working axis out of a transport plane into a forming position. In the event of a vertical arrangement with the working axis, the annular round blank is lifted out of the transport plane into the forming position. However, the working axis may also be oriented differently, for example horizontally, or be oriented inclined with respect to the horizontal or the vertical direction.

In, or adjoining, the transport plane, there is preferably arranged a revolving table for transporting an annular round blank to be formed to the forming device and for positioning said annular round blank coaxially with respect to the working axis A. After the forming process, the formed annular round blank can again be set into the respective pocket of the revolving table and be transported out of the forming device.

The upper tool associated with the lower tool comprises a holding sleeve. In the forming position of the annular round blank, the holding sleeve completely encloses the outside contour of the annular round blank. With the aid of this holding sleeve, it can be ensured that—while the inner rim of the annular round blank is being formed—there will be no or only a defined increase of the outside diameter of the annular round blank. Preferably, the holding sleeve has, in the forming position of the annular round blank, an inside diameter that is slightly greater than the original outside diameter of the annular round blank, so that the outside diameter of the annular round blank increases during the forming process by a specified amount, as a result of which the play of the annular round blank in the pocket can be reduced, so that the positioning of the annular round blank in a pocket of the revolving table may be more precise.

The upper tool and/or the lower tool comprise at least one forming tool. In the forming position of the annular round blank outside the transport plane, the forming tool engages at least partially in the annular round blank and forms the inner rim of the annular round blank. For example, it is possible to form a structure or at least a recess in the inner rim. It is possible to modify the inner rim of the annular round blank, to provide at least a bezel or groove in circumferential direction or to provide, in particular emboss, several recesses having any contour along the circumference of the inner rim.

In one embodiment, the upper tool may comprise an ejection device. The ejection device is disposed to move the annular round blank—after the forming process—out of the forming position back into the transport plane or to support this return movement. After forming, the annular round blank is seated in the holding sleeve and pushes against the inside of the holding sleeve. Via the ejection device, a force is applied to the annular round blank, after it has been formed, said force being able to act on the annular round blank in order to move it out of the holding sleeve and back into the transport plane, for example in a pocket of the revolving table. In one exemplary embodiment, the ejection device may comprise a spring-biased ejection ring that is deflected counter a spring force—during the movement of the annular round blank out of the transport plane—into the forming position and that pushes—during the return movement of the die after forming the inner rim of the annular round blank—back into the transport plane.

It is advantageous if the die of the lower tool is associated with at least one of the forming tools. In addition, the upper tool may comprise an additional forming tool that interacts with the forming tool of the lower tool for forming the annular round blank. However, it is also possible to provide only one forming tool on the die on the lower tool.

At least one of the existing forming tools may be configured as a spreading tool. The spreading tool is designed to be spread radially with respect to the working axis in the forming position of the annular round blank. As a result of this, said spreading tool can be pushed from the inside against the inner rim of the annular round blank in order to effect the forming of the inner rim.

For spreading the spreading tool, the upper tool may comprise a spreading mandrel. The spreading mandrel may have a section that tapers toward its free end or toward the die of the lower tool. This tapering section has a preferably conical contour. In this manner it is possible—depending on the position of the spreading tool along the working axis A—to achieve a defined spreading in a simple manner.

The spreading tool may form a hollow body; in particular, the spreading mandrel may come into engagement in this hollow body to accomplish spreading.

In one exemplary embodiment, the spreading tool has several elastically movable spreading elements that are arranged in circumferential direction about the working axis. The spreading elements may be elastically deformable, preferably elastically bendable, and may deform radially elastically toward the working axis out of their resting position.

Each spreading element may have a forming projection on its side facing away from the working axis. When the spreading tool is spread, the forming projection is disposed to press into the inner rim of the annular round blank. As a result of this, a corresponding recess can be formed on the inner rim of the annular round blank.

The elastically movable spreading elements may be configured in the manner of leaf springs.

It is also possible to support the forming tool arranged on the die so as to be rotatable about the working axis. For example, to accomplish this, the inner rim of the annular round blank can be provided with knurling or a thread. In doing so, the forming tool may be embodied in such a manner that it has a slightly greater diameter than the inner rim of the annular round blank and then rotates in this inner rim due to the configuration of the forming tool about the working axis when being pressed in. In other embodiments, the forming tool could also be rotated about the working axis by a drive, for example, if more complex shapes such as threads or the like are to be worked into the inner rim of the annular round blank.

In one exemplary embodiment the forming tool arranged on the die is disposed for forming the associate lower edge region of the inner rim. For example, there may be provided a bezel or a groove. Accordingly, it is possible, additionally or alternatively, to have a forming tool on the upper tool, said tool being disposed for forming the upper region of the inner rim.

In one advantageous embodiment a support sleeve is provided on the die, said support sleeve being disposed for moving the annular round blank out of the transport plane into the forming position during a movement of the die along the working axis in the direction toward the upper tool. The support sleeve can come into contact with the annular surface of the annular round blank associated with the lower tool and move said annular round blank into the holding sleeve. This movement may alternatively also be performed by a forming tool provided on the die.

It is advantageous if the support sleeve coaxially encloses a forming tool provided on the die. The support sleeve is provided in particular in the embodiment of the forming tool as a spreading tool. The support sleeve is advantageous whenever the forming tool, due to its radial dimension or configuration, is not suitable to position the annular round blank—exactly radially with respect to the working axis in the forming position—inside the holding sleeve.

It is advantageous if the support sleeve is supported in a spring-biased manner in the direction of the working axis. As a result of this the annular round blank is moved in the forming position with a specified force into the holding sleeve. Preferably, the annular round blank is in the forming position between the support sleeve and an ejection device on the upper tool. In doing so, the ejection device defines the forming position, and the support sleeve acts against the force of the ejection device, as a result of which the forming tool, in particular the spreading tool, comes into engagement with the annular round blank on the die.

Preferably, the forming device described hereinabove is provided on a forming station. The forming station belongs to an arrangement that also comprises a transport device with a revolving table that can be rotated about a revolving axis by means of a revolving drive. Preferably, the revolving drive is configured as a stepping drive. During each step a pocket of the revolving table with an annular round blank is transported into the forming device and a formed annular round blank is transported out of the forming device.

The forming of an annular round blank with the aid of the previously described forming device is performed as follows:

First, preferably with the aid of the revolving table, an annular round blank to be formed is positioned in the forming device, coaxially with respect to the working axis. The annular round blank is initially located in the transport plane in which the revolving table is arranged. The die of the lower tool is moved in the direction toward the upper tool. In doing so, the annular round blank is moved by a forming tool on the die and a support ring—or by another suitable means on the die—out of the transport plane and, for example out of the pocket of the revolving table, into the forming position inside the holding sleeve. In this forming position, the inner rim of the annular round blank is formed. In doing so, the outside diameter of the annular round blank can enlarge, in which case the enlargement is limited by the holding sleeve.

Subsequently, the die performs a movement away from the upper tool. During this movement, the formed annular round blank is moved back into the transport plane and, according to the example, into a pocket of the revolving table. Subsequently, the formed annular round blank can be transported out of the forming device.

BRIEF DESCRIPTION OF THE DRAWINGS

Advantageous embodiments of the invention can be inferred from the claims, the description and the drawings.

Hereinafter, advantageous exemplary embodiments are explained in detail with reference to the appended drawings. They show in FIG. 1 a schematic, block diagram-like representation of a deforming station comprising a transport device;

FIGS. 8 to 20 each a schematic, perspective representation of a formed annular round blank, wherein various structures or different forms of recesses are provided on the inner rim of the annular round blank, which said recesses can be produced with a forming device according to the invention.

DETAILED DESCRIPTION OF THE INVENTION

Figure 1:
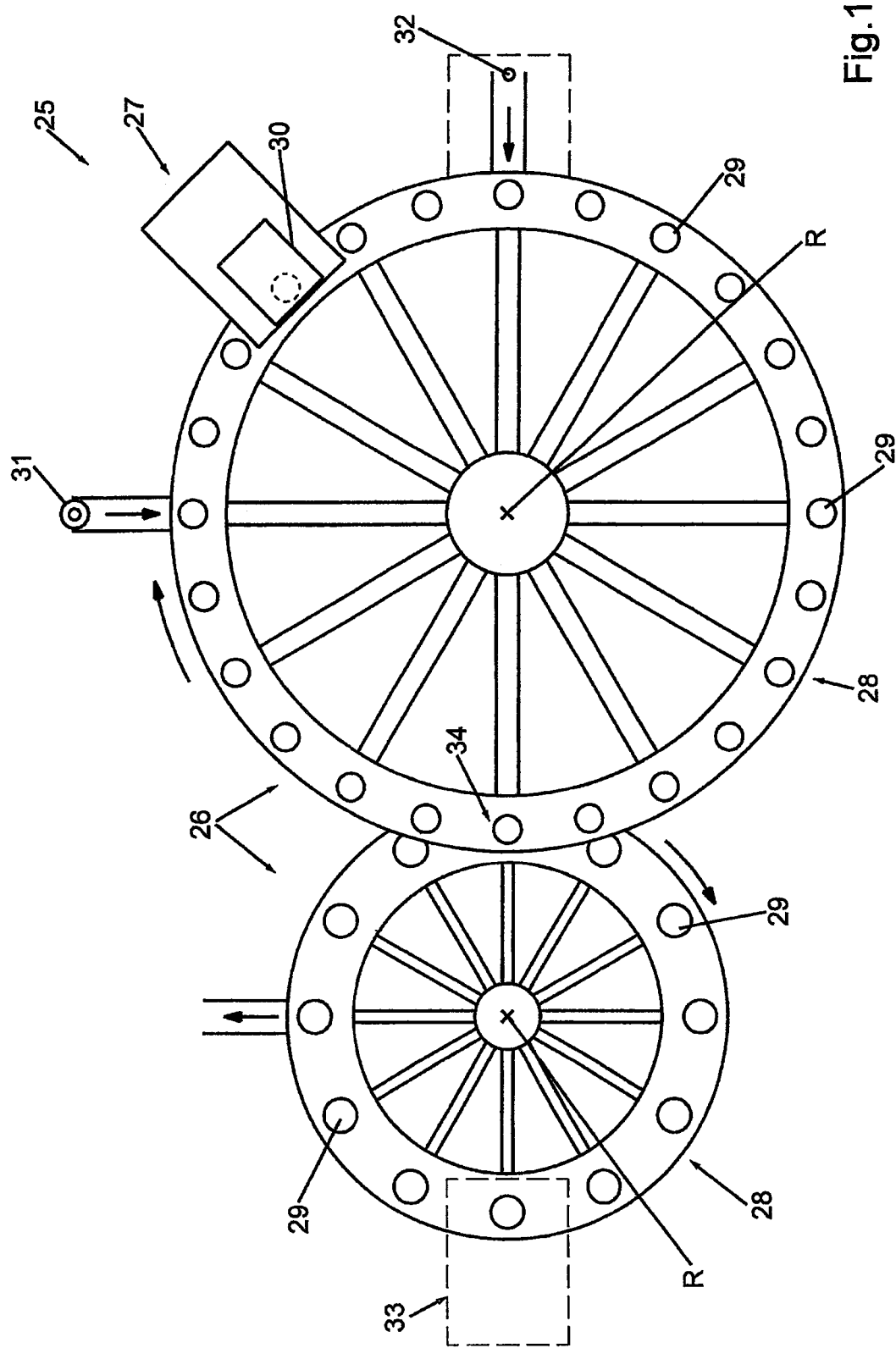

FIG. 1 shows an arrangement 25 comprising a transport device 26 and a forming station 27. The transport device 26 comprises at least one revolving table, and, in the case of the exemplary embodiment, two revolving tables 28. Each revolving table 28 can be driven about an associate revolving axis R. To accomplish this, one or respectively one associate, not illustrated, revolving drive is used. The revolving table 28 performs an incremental movement about its revolving axis R. The incremental advance angle is adapted to the number of pockets 29 that are arranged so as to be uniformly distributed in the circumferential region of each revolving table 28.

One revolving table 28 is associated with the forming station 27 that comprises a forming device 30. Viewed in the direction of rotation of the revolving table 28 about its revolving axis R, a supply point is provided in front of the forming station 27, at which supply point the annular round blanks 31 are inserted into the pockets 29 of the revolving table 28. A single annular round blank 31 is arranged in each pocket. During each incremental advance movement of the revolving table 28, an annular round blank 31 is transported into the forming station 27 and arranged there coaxially with respect to a working axis A. When the revolving table 28 is stopped, a forming process of the annular round blank 31 takes place in the forming station 27. After forming, the formed annular round blank is moved out of the forming station 27 during the subsequent incremental advance movement, and the next annular round blank 31 to be formed is supplied.

Furthermore, FIG. 1 shows that, at another location, it is possible to insert a round blank core 32 into the formed annular round blank 31. The round blanks consisting of the annular round blank 31 and the round blank core 32 located in their respective pockets 29 are then supplied, via the transport device 26, to an embossing station 33 and embossed there to produce a coin. In doing so, a firm connection is provided between the round blank core 32 and the annular round blank 31. In the exemplary embodiment, the embossing station 33 is allocated to the additional revolving table 28 that has the smaller diameter, for example. The nested components of the round blank (for example, the annular round blank 31 and the round blank core 32) are transferred, at a transfer point 34, by the revolving table 28 that is associated with the forming station 27 to the respectively other revolving table 28 that is associated with the embossing station.

Nowadays, coins are frequently produced in several parts, for example in order to achieve different colors. In the exemplary embodiment described herein, the round blank comprises an annular round blank 31 and a round blank core 32. In modification thereof, it is also possible to provide several coaxially arranged annular round blanks 31. It is also possible to manufacture the coin of various materials. Preferably, the annular round blank 31 that is formed with the forming device 30 and the forming method according to the invention, respectively, is harder than the round blank part directly adjoining the annular round blank 32 or, alternatively, is also an additional annular round blank. In one exemplary embodiment, the round blank part—in accordance with the example, the round blank core 32—in contact with the formed annular round blank 31—may also consist of a softer and more readily formable material than the annular round blank 31 that is to be formed, for example of a non-metallic material such as a plastic material.

Figure 2:
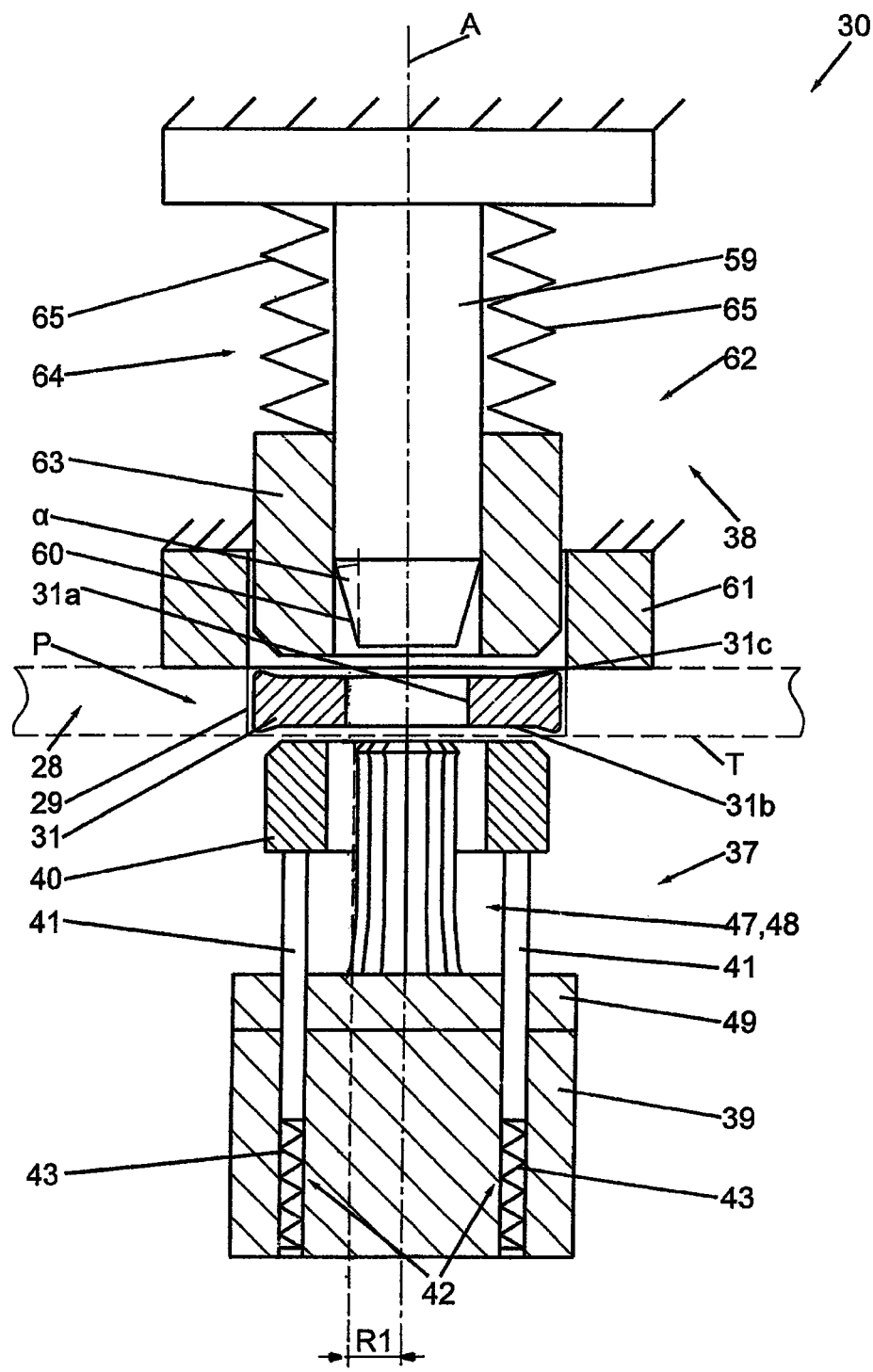
FIG. 2 a schematic, block diagram-like representation of a deforming device, wherein the annular round blank is located in a transport plane.
Figure 3:
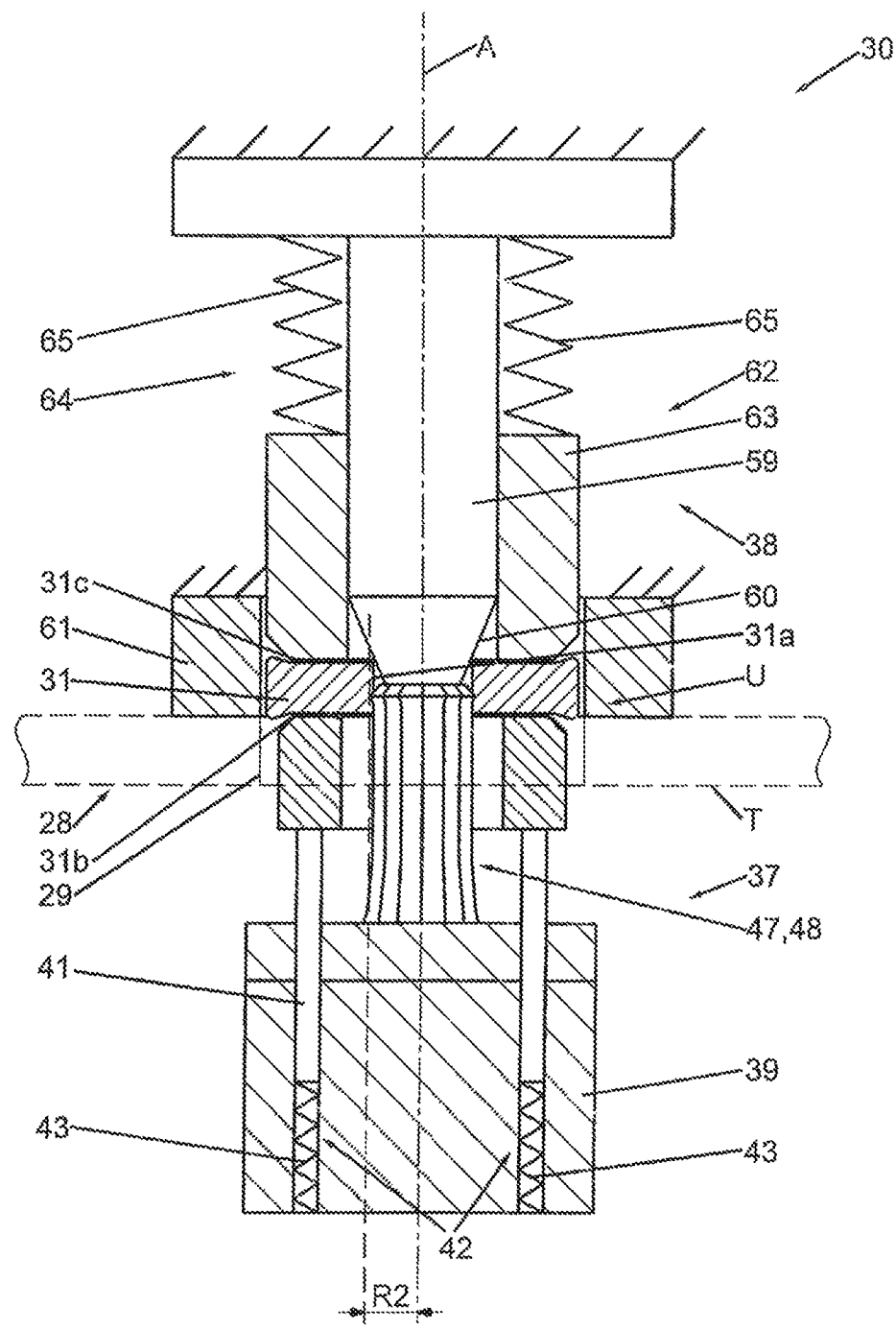
FIG. 3 the exemplary embodiment of the forming device of FIG. 2, wherein the annular round blank is located in a forming position.

One exemplary embodiment of the forming device 30 for forming the annular round blank 31 is shown by FIGS. 2 and 3. The forming device 30 comprises a lower tool 37, as well as an upper tool 38. The lower tool 37 and the upper tool 38 are aligned along the working axis A and are located opposite each other on different sides of a transport plane T. The annular round blanks 31 are transported along the transport plane T, i.e., in accordance with the example, by the revolving table 28. In the starting position, the lower tool 37 and the upper tool 38 are opposite each other on both sides of the revolving table 28.

The annular round blank 31 has an inside diameter that is limited by an inner rim 31a. Adjoining the inner rim 31a, there is an underside 31b facing the lower tool 37 and an upper side 31c facing the upper tool 38 (see FIGS. 8 to 20). In a starting position P after a not yet formed annular round blank 31 has been supplied to the forming device 30, the annular round blank 31 is located in a pocket 29 between the lower tool 37 and the upper tool 38 in an manner approximately coaxial with respect to the working axis A. The revolving axis R of the at least one revolving table 28 is oriented parallel to the working axis A.

In the exemplary embodiment, the lower tool 37 has a die 39 that can be moved along the working axis A. Due to the movement of the die 39 along the working axis A, the annular round blank 31 is moved out of its starting position P (FIG. 2) into a forming position U at a distance from the transport plane T and, in accordance with the example, outside the pocket 29 of the revolving table 28. In the exemplary embodiment according to FIGS. 2 and 3, a support ring 40 is arranged on the die 39 coaxially with respect to the working axis A. The support ring 40 is located opposite the underside 31b of the annular round blank 31. In the exemplary embodiment, the support ring 40 is elastically supported in the direction of the working axis A opposite the die 39. To do so, the support ring is shiftably supported over several supports 41 in recesses—for example, sack holes—of the die 39. The ends of the supports 41 opposite the support ring 40 are supported by the die 39 by means of a first spring arrangement 42. In the exemplary embodiment, each support 41 is associated with a spring 43 that may be configured as a helical spring. In the starting position of the lower tool 37, the support surface of the support ring 40 associated with the annular round blank 31 is preferably located in the transport plane T.

In the first exemplary embodiment of the forming device 30 according to FIGS. 2 and 3, a forming tool 47 is provided on the lower tool 37. In the exemplary embodiment, the forming tool 47 is configured as a spreading tool 48. It is disposed to be spread or widened radially with respect to the working axis A for forming the inner rim 31a of the annular round blank.

Figure 4:
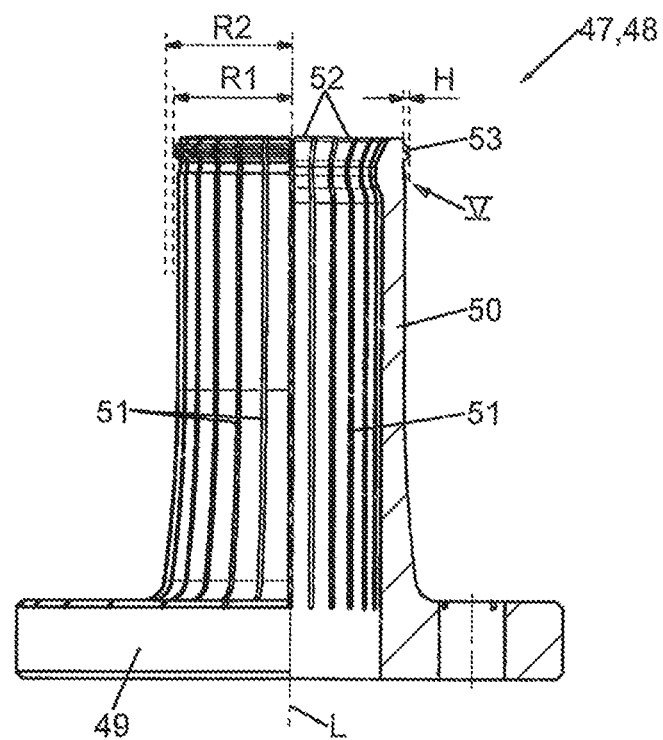
FIG. 4 a side view, partially in section, of a forming tool embodied as a spreading tool for an exemplary embodiment of the forming device.
Figure 5:
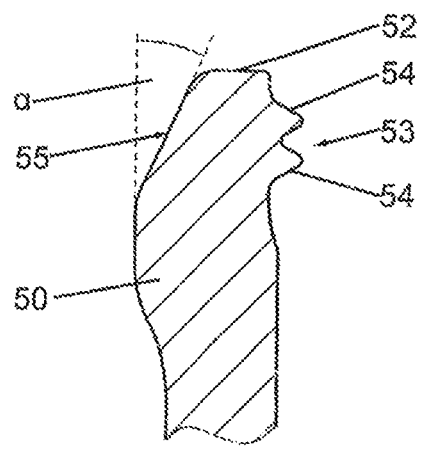
FIG. 5 a view of a detail of the forming tool in the region V in FIG. 4.

FIGS. 4 and 5 show an exemplary embodiment of the spreading tool 48. The spreading tool 48 has a base part 49 which, in the exemplary embodiment, is represented by a circular plate. The spreading tool 48 is mounted to the die 39 by means of the base part 49. Several spreading elements 50 extend from the base part 49. The spreading elements 50 are uniformly distributed in circumferential direction around a longitudinal axis L of the spreading tool 48 and form a hollow body around the longitudinal axis L. Directly adjacent spreading elements 50 are separated from each other by a gap 51 extending parallel to the longitudinal axis L. Originating from the base part 49, each of the spreading elements 50 extends toward a free end 52. On the outside facing away from the longitudinal axis L, adjoining the free end 52, there is provided a forming projection 53 on each spreading element 50. The forming projection 53 may have any desired configuration and, as in the exemplary embodiment, may have the form of two adjacent, approximately triangular prongs 54. The design of the forming projection 53 determines the form of a recess that is imparted in the inner rim 31a of the annular round blank 31 during the forming process. The forming projection 53 is configured depending on the desired form of this recess.

On the inside facing away from the forming projection 53, each spreading element 50 has an inclined surface 55 adjoining the free end 52. The inclined surface 55 includes an angle of inclination a with the longitudinal axis L. The inclined surfaces 55 of all spreading elements 50 form a somewhat conical surface interrupted by the gaps 51. This conical surface widens toward the free end 52 of the spreading elements 50.

At a distance from the forming projection 53, each spreading element is pivotally movable radially with respect to the longitudinal axis L and is preferably elastically supported or configured. In the exemplary embodiment described herein, the spreading elements 50 are configured so as to be integral with the base part 49 in one piece, without seams and joints. They are elastically formable radially with respect to the longitudinal axis L. They assume the resting or starting position shown by FIG. 4, when no outside force for spreading the spreading tool 48 acts on the spreading elements 50. They return again into this resting state after having been spread. In this resting state, the ends of the forming projections 53 that are radially at a greater distance from the longitudinal axis L are located on a cylindrical generated surface having a first radius R1. This first radius R1 is smaller than the radius of the inner rim 31a of the annular round blank in its non-formed state (FIG. 2).

In the exemplary embodiment according to FIGS. 4 and 5, the spreading elements 50 of the spreading tool 48 are configured in the manner of leaf springs, so to speak, so that the region with the forming projection 53—starting from the resting state in FIG. 4, can be elastically bent toward the outside in upward direction when a force acts radially outward from the longitudinal axis L on the spreading element 50 in the region of the free end 52. If all spreading elements 50 are radially displaced in outward direction, the radially outermost ends of the forming projections 53 assume a position on a cylindrical generated surface having a second radius R2 (FIGS. 3 and 4). Preferably, the difference between the two radii R2 and R3 corresponds to the radial height H of the forming projections 53 (FIG. 4). In each case, the second radius R2 is greater than the first radius R1, and the difference corresponds to the depth of the recess formed in the inner rim 31a, to which corresponds at most the height H of the forming projection 53.

In accordance with the example, the forming tool 47 and the spreading tool 48, respectively, are arranged coaxially with respect to the working axis, so that, according to FIGS. 2 and 3, the longitudinal axis L and the working axis A extend on a common straight line.

In the exemplary embodiment according to FIGS. 2 and 3, the upper tool 38 has a spreading mandrel 59 that is arranged coaxially with respect to the working axis A and that cannot be moved relative to the machine. Adjoining its free end associated with the lower tool 37, the spreading mandrel has a tapering section 60. This section 60 is preferably configured as a conical section. The angle of this conical section 60 relative to the working axis A preferably corresponds approximately to the angle of inclination a or the inclined surfaces 55 on the spreading tool 48.

The tapering or conical section 60 is enclosed by a holding sleeve 61, coaxially with respect to the working axis A. The holding sleeve 61 is arranged at a radial distance from the spreading mandrel 59. The inside diameter of the holding sleeve 61 defines and limits the outside diameter of the annular round blank 31, said outside diameter being displayed by said blank following the formation of the inner rim 31a. In the exemplary embodiment, the inside diameter of the holding sleeve 61 is greater than the outside diameter of the annular round blank 31 in its non-formed starting condition.

Furthermore, the upper tool 38 comprises an ejection device 62. In accordance with the example, the ejection device 62 comprises an ejection sleeve 63 that is supported so as to be movable along the working axis A and is displaced by a second spring arrangement 64 toward the lower tool 37 into a starting position. The second spring arrangement 64 may comprise several springs 65, for example helical springs, that are distributed around the working axis A in circumferential direction. In the starting position defined by the spring arrangement 64, the ejection sleeve 63 comes into engagement with the radially inward region of the holding sleeve 61.

The exemplary embodiment of the forming device 30 according to FIGS. 2 and 3 works as follows:

Due to the incremental movement of the revolving table 28, an annular round blank 31 to be formed is arranged—coaxially with respect to the working axis A—between the lower tool 37 and the upper tool 38. Subsequently, the die 39 performs a movement along the working axis A in the direction toward the upper tool 38. In doing so, the annular round blank 31 is moved away from the transport plane T into its forming position U by means of the support ring 40 that acts on the underside 31b of the annular round blank 31, in which forming position said annular round blank is preferably located completely within the holding ring 61 (FIG. 3).

In the exemplary embodiment, the ejection sleeve 63 recedes slightly against the force of the second spring arrangement 64. Because of the greater spring force of the second spring arrangement 64, however, the spring travel is shorter than that of the first spring arrangement 42 that supports the support ring 40 on the die 39. As a result of this, a relative movement between the forming tool 47 and—in accordance with the example—the spreading tool relative to the support sleeve 40 takes place. The support surface of the support sleeve 40 abuts against the underside 31b of the annular round blank while the forming tool 47 engages in the annular round blank 31 (FIG. 3). During this movement, the spreading elements 50—and, according to the example—the inclined surfaces 55 come into contact with the conical section 60 of the spreading mandrel 59 and are then displaced radially outward away from the working axis A. During this radial movement, the forming projections 53 are pressed into the inner rim 31a of the annular round blank 31 and form a recess there.

Subsequently, the die 39 is moved along the working axis A away from the upper tool 38. As a result of the fact that the forming projections 53 are still in engagement with the annular round blank 31, said blank is moved out of the holding sleeve 61 along the working axis A in the direction toward the transport plane T. This movement of the annular round blank 31 out of the forming position in the holding sleeve 61 back to the transport plane T is supported by the force of the second spring arrangement 64 that pushes the ejection sleeve 63 onto the upper side 31c of the annular round blank 31. During this movement, there again occurs a relative movement between the forming tool 47 and the support sleeve 40. The spreading elements 50 spring radially back in the direction toward the working axis A. As soon as the force by the ejection device 62 acting on the annular round blank 31 subsides, the support sleeve 40 can be moved by the force of the first spring arrangement 42 away from the die 39 and relative to the forming tool 47 until it again assumes its original position as illustrated by FIG. 2. Then the formed annular round blank 31 is held by the support sleeve 40 in the pocket 29 on the transport plane T. By means of the next incremental movement of the revolving table 28, the formed annular round blank 31 is removed from the forming device 30 and the next annular round blank 31 that is to be formed is supplied.

Figure 6:
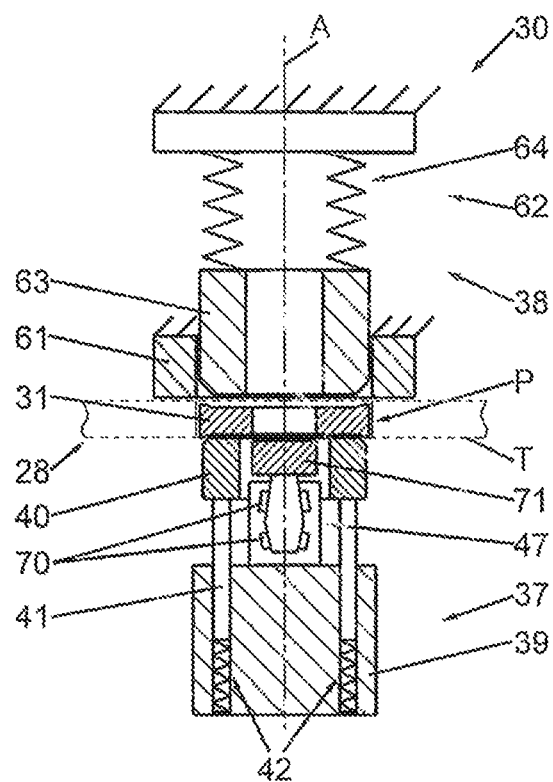
FIGS. 6 and 7 each a schematic block diagram-like representation of another exemplary embodiment of a forming device.

FIG. 6 shows another exemplary embodiment of a forming device 30. In doing so, the forming tool 47 that is arranged on the die 39 is not configured as a spreading tool but is disposed for knurling the inner rim 31a of the annular round blank 31. For this reason, the forming tool 47 is supported so as to be rotatable about the working axis A—according to the example by means of a bearing unit 70, preferably a rolling bearing arrangement comprising several rolling bearings. The bearing arrangement 70 is configured in such a manner that the forming tool 47 is held so as not be movable in the direction of the working axis A relative to the die 39. The knurling tool 71 arranged on the forming tool 47 can be moved via a movement of the die 39 in the direction of the working axis A and can thus rotate about the working axis A. The outside diameter of the knurling tool 71 is greater than the original inside diameter of the non-formed annular round blank 31. In this embodiment—different from the exemplary embodiment according to FIGS. 2 and 3—there is no spreading mandrel 59. Other than that, the design is analogous to the exemplary embodiment described hereinabove, so that reference may be made the explanations hereinabove.

The annular round blank 31—as explained in conjunction with the previous exemplary embodiments—is moved into its forming position U. Due to the relative movement between the support ring 40 and the forming tool 47, the knurling tool 71 is moved into the annular round blank 31 and performs—during the movement along the working axis A—at the same time a rotational movement about the working axis A. As a result of this, the inner rim 31a of the annular round blank 31 is provided with a knurl.

If, instead of a knurl having one orientation (clockwise or counterclockwise), a cross-knurl is to be applied, two forming devices 30 or forming stations 27 can be arranged, these comprising appropriately configured knurling tools 71.

Figure 7:
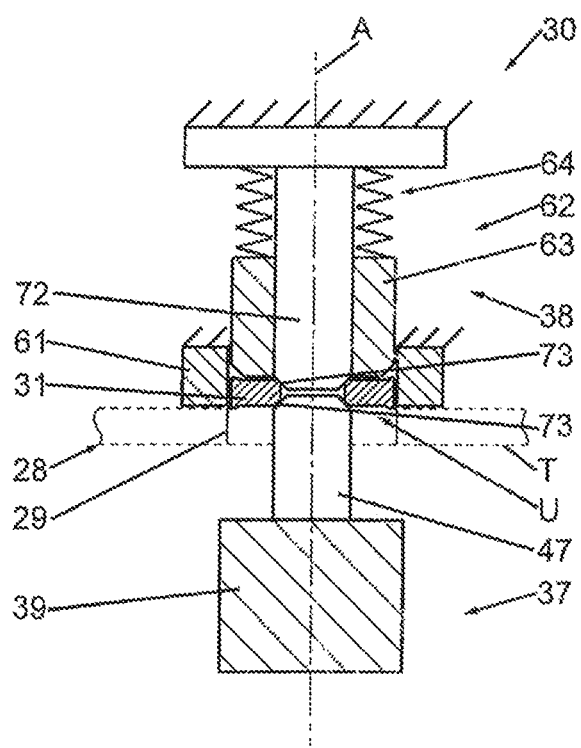

In the exemplary embodiments described hereinabove, the forming tool 47 is arranged on the die 39. Alternatively, it is also possible to provide an additional forming tool 72 on the upper tool 38, as is schematically illustrated in FIG. 7. There, the forming tool 47 of the lower tool 37 arranged on the die 39 and an additional forming tool 72 of the upper tool 38 interacting with the latter interact together.

Each of the two forming tools 47, 72 is arranged coaxially with respect to the working axis A and has, respectively, one free end with the exemplary conical forming section 73. In forming position U, the two forming tools 47, 72 push from opposite sides against a respectively associated lower edge region or upper edge region of the inner rim 31a and form there the respective annular round blank 31. For example, a bezel may be formed at the transition between the inner rim 31a and the underside 31b or the upper side 31c.

In this exemplary embodiment, the diameter of the forming tool 47 is greater than the diameter of the inner rim 31a, so that the annular round blank 31 can be moved by the forming tool 47 itself from the starting position P into the forming position U. In this exemplary embodiment, there is no need for the support ring 40 and its support means. In contrast with the exemplary embodiment according to FIGS. 2 and 3, the additional forming tool 72 is provided instead of the spreading mandrel 59 of the upper tool 38, said latter forming tool acting directly on the annular round blank 31 in its forming position U. In the forming position U, the ejection sleeve 63 is spring-biased by the second spring arrangement 64 in the direction toward the transport plane T, so that—following the forming process, during a retraction movement of the die 39—the formed annular round blank 31 is moved out of the holding sleeve 61 back into the pocket 29 of the revolving table 28.

The exemplary embodiment of the forming device 30 shown in FIG. 7 can be further modified in that the two forming tools 47, 72 have different contours in the forming section 73 on their respective free end that is associated with the annular round blank 31 for forming. For example, in that case annular offsets may be formed, so that grooves may be imparted in the upper edge region and in the lower edge region of the inner rim 31a of the annular round blank. Furthermore, the forming sections 73 may have elevations and/or recesses distributed about the working axis A in circumferential direction, so that any other embossings can also be formed in the upper edge region and in the lower edge region of the inner rim 31a of the annular round blank 31.

FIGS. 8 to 20 show different structures or forms that can be applied in the inner rim 31a of an annular round blank 31 by means of the inventive forming device 30 and the inventive method, respectively. These forms are only exemplary and can be supplemented by any additional forms.

FIG. 8 shows the formed annular round blank 31 as is produced in the exemplary embodiment with the forming device according to FIGS. 2 and 3 and by means of the spreading tool 48. Recesses are formed on the inner rim 31a, said recesses being arranged next to each other in circumferential direction and having a form corresponding to the respective forming projection 53. The recesses are minimally spaced apart in circumferential direction due to the gaps between the spreading elements and thus between the forming projections 53.

FIG. 9 shows a multi-start thread formed in the inner rim 31a. In the example according to FIG. 10, a simple thread (one thread) with minimal pitch is formed in the inner rim 31a.

The inner rim 31a in the example of FIG. 11 has a left-right knurl that can be produced with two forming devices according to the exemplary embodiment of FIG. 6.

According to FIG. 12, several recesses or pockets are formed on the inner rim 31a of the annular round blank 31—for example 6 (six) pockets that are arranged uniformly distributed in circumferential direction. In this case, the pockets have a groove-like configuration.

The pattern applied to the inner rim 31a of the exemplary embodiment according to FIG. 13 is referred to as "flower". In the upper edge region and in the lower edge region of the inner rim 31a elongated concave recesses are imparted in circumferential direction, said recesses being arranged uniformly distributed in circumferential direction.

In the exemplary embodiment, the inner rim 31a may have a single bezel in the upper edge region (FIG. 14) or, alternatively, may have a bezel in the lover edge region or a bezel each in both the upper edge region and the lower edge region (FIG. 15).

The inner rim 31a may, for example, also be imparted with an annular circumferential groove (FIG. 16) or also several annular circumferential grooves spaced apart in axial direction (FIG. 17).

In the exemplary embodiments according to FIGS. 18 to 20, teeth are provided on the inner rim 31a and arranged distributed over the circumference. The teeth are spaced apart by grooves that extend in axial direction (FIG. 20) or are inclined relative to the axial direction (FIG. 19) or crossed, respectively inclined relative to the axial direction (FIG. 19).

A plurality of modifications considering the forming of the inner rim 31a is possible, and the exemplary configurations described herein should be viewed only as being exemplary. Described in general, the inner rim 31a is formed by the device according to the invention or the method according to the invention in such a manner that said inner rim departs from a contour that corresponds to a cylindrical generated surface.

Due to this forming of the inner rim 31a, a form-locked connection between the annular round blank 31 and the adjoining round blank part—the round blank core 32 in accordance with the example—is achieved during the subsequent embossing of the round blank. The material of the round blank part—the round blank core 32 in accordance with the example—flows toward the annular round blank 31 during the embossing process and adapts to the form of the inner rim 31a. If recesses and elevations, respectively, exist there, a form-locked connection is achieved.

By means of the inventive forming device 30 and the forming method that can be carried out therewith, the annular round blank 31 can be formed within the usual process of feeding the round blank to the embossing station or embossing press. As a result of this, the manufacture of a coin is considerably simplified.

The invention relates to a forming device 30 and to a method for forming an inner rim 31a of an annular round blank 31. The forming device 30 has a lower tool 37 with a movable die 39 and an upper tool 38 arranged opposite the lower tool 37 along a working axis A. By means of the die 39, the annular round blank 31 is moved out of a transport plane T and into a forming position U towards the upper tool 38 and into the interior of a holding sleeve 61. Subsequently, the inner rim 31a is formed with the aid of a forming tool 47, 72. After forming, the annular round blank 31 is moved out of the forming position U and back into the transport plane T by means of the lower tool 37 and/or the upper tool 38. The forming device 30 and the forming method can occur while the round blanks are being fed—as takes place in any case—to the embossing station or embossing press, for example while the round blank parts and the round blanks, respectively, being transported by means of a revolving table.

LIST OF REFERENCE SIGNS

25 Arrangement
26 Transport device
27 Forming station
28 Revolving table
29 Pocket
30 Forming device
31 Annular round blank
31a Inner rim of the annular round blank
31b Underside of the annular round blank
31c Upper side of annular round blank
32 Core of the annular round blank
33 Embossing station
34 Transfer point
37 Lower tool
38 Upper tool
39 Die
40 Support ring
41 Support
42 First spring arrangement
43 Spring
47 Forming tool
48 Spreading tool
49 Base part
50 Spreading element
51 Gap
52 Free end of the spreading element
53 Forming projection
54 Prongs
55 Inclined surface
59 Spreading mandrel
60 Tapering section
61 Holding sleeve
62 Ejection device
63 Ejection sleeve
64 Second spring arrangement
65 Spring
70 Bearing arrangement
71 Knurling tool
72 Forming tool
Forming section
α Angle of inclination
A Working axis
P Starting position
R Revolving axis
R1 First radius
R2 second radius
T Transport plane
U Forming position

What is claimed is:

1. A forming device (30) for forming an inner rim (31a) of an annular round blank (31) of a round blank, comprising:

a lower tool (37) comprising a die (39) that can be moved along a working axis (A), said die being disposed to move the annular round blank (31) along the working axis (A) out of a transport plane (T) and into a forming position (U);

an upper tool (38) comprising a holding sleeve (61) that completely encloses the annular round blank (31) in the forming position (U) along the outside contour of the annular round blank (31);

at least one forming tool (47, 72) that is a component of the lower tool (37) and/or the upper tool (38) and is disposed to engage in the annular round blank (31) in the forming position (U) and to form the inner rim (31a);

wherein the lower tool (37) and/or the upper tool (38) are disposed to move the annular round blank (31), after having been formed, out of the forming position (U) and back into the transport plane (T);

wherein the at least one forming tool (47) is arranged on the die (39) of the lower tool (37) and is configured as a spreading tool (48) that can be expanded radially relative to the working axis (A) in a forming position (U) of the annular round blank (31);

wherein a spreading mandrel (59) is provided on the upper tool (38) configured to expand the spreading tool (48), wherein the spreading mandrel (59) has a section (60) tapering toward the free end of the spreading mandrel (59); and, wherein a support sleeve (40) is configured to be supported on the die (39) of the lower tool (37) and the support sleeve (40) coaxially encloses the forming tool (47), wherein the support sleeve (40) is configured to contact and to move the annular round blank (31) out of the transport plane (T) into the forming position (U) during a movement of the die (39) along the working axis (A) in the direction toward the upper tool (38).

2. The forming device (30) according to claim 1, characterized in that the spreading tool (48) forms a hollow body.

3. The forming device (30) according to claim 2, characterized in that the spreading tool (48) comprises several spreading elements (50) that are elastically movable and that are arranged in circumferential direction around the working axis (A).

4. The forming device (30) according to claim 3, characterized in that each spreading element (50) has, on its side facing away from the working axis (A), a forming projection (53) that is disposed to press the annular round blank (31) into the inner rim (31a) when the spreading tool (48) is being spread open.

5. The forming-device (30) according to claim 1, characterized in that the forming tool (47) arranged on the die (39) is supported so as to be rotatable about the working axis (A).

6. The forming device (30) according to claim 1, characterized in that the forming tool (47) arranged on the die (39) is disposed to form the associate lower edge region of the inner rim (31a).

7. The forming device (30) according to claim 1, characterized in that the upper tool (38) comprises at least one of the forming tools (72) that is disposed to form the associate upper edge region of the inner rim (31a).

8. The forming device (30) according to claim 1, characterized in that the support sleeve (40) is supported on the die (39) of the lower tool (37) by a first spring arrangement (42).

9. The forming device (30) according to claim 8, characterized in that the upper tool 38 comprises an ejection device 62 configured to move the annular round blank after the forming process out of the forming position (U) back in the transport plane (T), wherein the ejection device (62) comprises an ejection sleeve (63) that is movably supported along the working axis (A) and urged into an initial position toward the lower tool (37) by a second spring arrangement (64).

10. An arrangement comprising a forming station (27) with the forming device (30) according to claim 1 and a transport device (26), wherein the transport device (26) comprises a revolving table (28) that is supported so as to be rotatable about a revolving axis (R), which revolving table has several pockets (29) in its circumferential region for accommodating respectively one annular round blank (31), and which is driven by a revolving drive for transporting an annular round blank (31) to be formed into the forming station (27) and a deformed annular round blank (31) out of the forming station (27).

11. A method for forming an inner rim (31a) of an annular round blank (31) with the use of a forming device (30) displaying the features according to claim 1, comprising the following steps:

Positioning an annular round blank (31) in the transport plane (T) coaxially with respect to the working axis (A) of the forming device (30), Moving the die (39) in the direction toward the upper tool (38), as a result of which the annular round blank (31) is moved out of the transport plane (T) into the forming position (U), Forming the inner rim (31a) of the annular round blank (31) with the use of the at least one forming tool (47, 72), Moving the die (39) away from the upper tool (38), Moving the formed annular round blank (31) out of the forming position (U) back into the transport plane (T).

12. The forming device (30) according to claim 3, characterized in that the spreading elements (50) form the hollow body, wherein two spreading elements (50) arranged directly adjacent in circumferential direction about the working axis (A) are separated by a gap (51).

13. The forming device (30) according to claim 4, characterized in that each spreading element (50) has adjoining to the free end (52) an inclined surface (55) at the inside facing away from the forming projection (53).

14. The forming device (30) according to claim 13, characterized in that the inclined surfaces (55) of all spreading elements (50) form a conical surface that is interrupted by gaps (51).

15. The forming device (30) according to claim 3, characterized in that the spreading tool (48) has a base part (49) mounted on the die (39), wherein the spreading elements (50) extend from the base part (49) toward their free ends (52), wherein the spreading elements (50) are integral with the base part (49).

16. The forming device (30) according to claim 9, characterized in that the spring rate of the second spring arrangement 64 is larger than the spring rate of the first spring arrangement 42.

\* \* \* \* \*